(12) United States Patent
Kennedy (10) Patent No.: US 7,437,437 B2
(45) Date of Patent: Oct. 14, 2008

(54) ACCESS AUTHENTICATION FOR DISTRIBUTED NETWORKS

(75) Inventor: Paul Kennedy, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1449 days.

(21) Appl. No.: 09/841,008

(22) Filed: Apr. 25, 2001

(65) Prior Publication Data

US 2002/0162028 A1    Oct. 31, 2002

(51) Int. Cl.
G06F 15/173 (2006.01)
G06F 17/30 (2006.01)

(52) U.S. Cl. .......................................... 709/223; 707/9
(58) Field of Classification Search ................. 709/213, 709/223; 713/201, 153; 726/3; 707/9
See application file for complete search history.

(56) References Cited

U.S. PATENT DOCUMENTS

| | | | |
|---|---|---|---|
| 6,301,589 B1 * | 10/2001 | Hirashima et al. | 707/204 |
| 6,308,173 B1 * | 10/2001 | Glasser et al. | 707/9 |
| 6,438,549 B1 * | 8/2002 | Aldred et al. | 707/9 |
| 6,446,204 B1 * | 9/2002 | Pang et al. | 713/153 |
| 6,470,332 B1 * | 10/2002 | Weschler | 707/3 |
| 6,490,619 B1 * | 12/2002 | Byrne et al. | 709/223 |
| 6,539,021 B1 * | 3/2003 | Kennelly et al. | 370/401 |
| 6,615,223 B1 * | 9/2003 | Shih et al. | 707/201 |
| 6,625,615 B2 * | 9/2003 | Shi et al. | 707/103 R |
| 6,629,132 B1 * | 9/2003 | Ganguly et al. | 709/213 |
| 6,681,330 B2 * | 1/2004 | Bradford et al. | 726/3 |
| 6,708,170 B1 * | 3/2004 | Byrne et al. | 707/9 |
| 6,732,168 B1 * | 5/2004 | Bearden et al. | 709/223 |

* cited by examiner

Primary Examiner—Christian LaForgia (57) ABSTRACT

The present invention provides an account management system and method for use within a computer network that allows for automated provisioning, configuration, and maintenance of the servers and other devices connected to a computer network. This account management system and method make use of a master directory structure which is replicated by way of a directory structure replication hub to multiple remote data centers in the form of multiple copies of a directory structure. The directory structure allows access to various customers, who may access information contained only within that particular customer's account. Authentication information for each of the customers is located within the copies of the directory structures contained at each customer data center, and therefore transmitting authentication information is not required.

7 Claims, 6 Drawing Sheets

ACCESS AUTHENTICATION FOR DISTRIBUTED NETWORKS

FIELD OF THE INVENTION

The present invention is directed to a distributed network having multiple servers and other devices that are provisioned or configured for support and hosting of sites and/or resources on the Internet, intranets, and other communications networks. More particularly, the present invention is directed to an access authentication system and method for use by multiple entities, each of whom requires access to at least a portion of a network which provides such resources.

BACKGROUND OF THE INVENTION

The growing popularity and increasing accessibility of the Internet has resulted in its becoming a major source of information, as well as a vehicle for inter-party transactions, in a variety of environments. For instance, a number of different types of entities, from government agencies to school systems and other organized groups, host Internet and/or intranet websites that provide information about themselves and topics related to their interests. Similarly, commercial enterprises employ websites to disseminate information about their products or services, as well as conduct commercial transactions, such as the buying and selling of goods. To support these activities, each website requires an infrastructure that stores the information provided by that site, responds to user requests for the information, and conducts other types of transactions appropriate to the site. A significant component of this infrastructure is a web server, which receives requests for information, retrieves it from the appropriate sources, and provides it to the requester. Websites which provide more complex services, such as on-line ordering, may also include application servers to support each additional function. In the case of a relatively small entity, the infrastructure to support a website may be as simple as a single server, or even a portion of the server. Conversely, a large popular website that consists of several thousand pages of information and that is accessed quite frequently may require numerous servers to provide the necessary support. Similarly, websites for commercial entities, through which transactional operations are conducted, may employ multiple application servers to support transactions with a large number of customers at a time.

From time to time, multiple entities may desire to have their websites supported by an organization that specializes in such a service. In such a situation, employees of the various entities may require access to the servers and other devices that support their respective websites, for example to update content, perform routine maintenance, etc. At the same time, personnel at the support organization also require access to these devices, to upgrade, reconfigure or retire components of the infrastructure. When a single organization is responsible for supporting the data of multiple entities, and different groups of people require access to that data, a problem may arise in that the data from one entity may inadvertently become accessible to personnel of another entity. The resulting lack of privacy, and integrity, of each entity's data is cause for serious concern.

Prior to the present invention, a common solution was to provide separate storage facilities and networks for each entity's data, which are each accessible only by the entry of a user name and password. Once the user name and password have been entered by an authorized person from a particular entity, then the devices associated with that entity's website information may consult an account database for the purpose of verification. Once verification has been determined, access may be granted to all data contained within that particular entity's support systems.

This solution, while providing some data security, has its limitations. For example, if the database containing the verification information, such as the user name and password information, is compromised, then the security and integrity of the data of all entities may be attacked by a person other than those who are authorized to access it. Moreover, if the database is stored at a site remote from the devices themselves, any communication malfunctions between the devices and the account database will hinder each entity's attempt to access its own information contained within its support network. Furthermore, because of the multiple, separate support structures for each entity, once an authorized person has gained access to a given entity's system by way of a user name and password, the access to the information of that entity is potentially unlimited. These multiple support systems for each entity also require great amounts of space and significant efforts in maintaining the data current.

These concerns are exacerbated by the fact that, as websites scale upwardly and/or the number of entities being serviced increases, the support organization's resources are distributed over multiple locations. Typically, the components which make up a large part of the supporting infrastructure, such as servers, firewalls, load balancers, etc., are housed in a facility known as a data center. A support organization may distribute this infrastructure among multiple data centers, to provide redundancy as well as reduced latency for end users who connect to a website from diverse geographic locations. For personnel of the supported entities, it is desirable for them to be able to utilize the same user name and password for all of their servers, regardless of which data center they may be located in. For personnel of the support organization, it is not only desirable for them to use the same user name and password at each of the various data centers, but also to use them across all of the multiple entities for whom access is authorized.

In theory, it is possible to have a single point of authentication data at a central location, e.g. a master data center, where servers at other data centers call back to this central location for authorization whenever someone tries to access one of them. As a practical matter, however, such a solution is not reliable. The need to call back to the master data center for authorization data renders the system vulnerable to overload conditions and communication interruptions, thereby frustrating the attempts of those who are legitimately entitled to access the equipment.

The alternative approach is to establish authentication data at each of the distributed locations. A significant problem associated with this approach lies in the management of the data. As authorized users are added and deleted, and users change their access names and/or passwords, these changes must be reliably recorded at each of the locations if a consistent access mechanism is to be available for all authorized users.

Accordingly, it is desirable to provide a system and method for access control within the context of a multi-party communications network that provides sufficient security of the data of individual supported entities, and which exhibits sufficient flexibility to accommodate the different needs of each of the entities who provide services by way of the network, while continuing the ability of personnel at the support organization to access devices associated with multiple entities, as necessary.

SUMMARY OF THE INVENTION

In accordance with the present invention, the foregoing objectives are achieved by way of a centralized directory structure, that uses a single master and provides for replication of the directory structure at each of the sites at which servers and other accessible components are located, such as data centers. Since all access authorization is based upon a master structure, the access credentials are readily manageable. All changes to that data only need to be entered at one location. The master structure then disseminates these changes to all of the replications at the various sites, to provide consistent access control among the sites.

Another feature of the invention is that the master structure enables the access credentials to be segregated by individual entity, thus permitting different persons having authorized access to two different entities' sites, respectively, to employ the same user name and/or password as unique identifiers at each of those sites. Hence, greater flexibility is provided for users in selecting their access names and passwords, since they are not required to be unique across the entire network supported by the support organization. They only need to be unique within a given entity's portion of the network.

These and other features of the invention are explained in greater detail hereinafter with reference to an exemplary embodiment of an invention illustrated in the accompanying drawings.

BRIEF DESCRIPTION OF THE DRAWINGS

FIGS. 3A-3H are flow diagrams describing the installation, or replication, of a directory structure in accordance with one embodiment of the present invention.

DETAILED DESCRIPTION

To facilitate an understanding of the principles of the present invention, it is described hereinafter with reference to its application in a computer network, of a type wherein a support organization provides the infrastructure and support for websites and other network resources of multiple entities, referred to hereinafter as customers. The present invention is implemented in such a network, wherein the support organization provides services to provision, configure, maintain, and/or monitor each of the servers or devices that form part of the network. It will be appreciated, however, that the implementation of the invention that is described hereinafter is merely exemplary, and that the invention can find practical application in any environment where a centralized security structure is employed for multiple users accessing various portions of the network resources.

As mentioned earlier, previous systems in which multiple accounts were used to access network devices employed a user identification and password verification system that performed verification checks with a database that was stored locally at the site of the devices being accessed. Thus, multiple copies of verification information necessarily existed on each of the host systems in the form of these local databases. However, the present invention obviates the need for replicating and updating a database containing user identification information and passwords, by using a centralized directory structure that allows access to only a specific portion of the overall structure to each user of the network.

Figure 1:
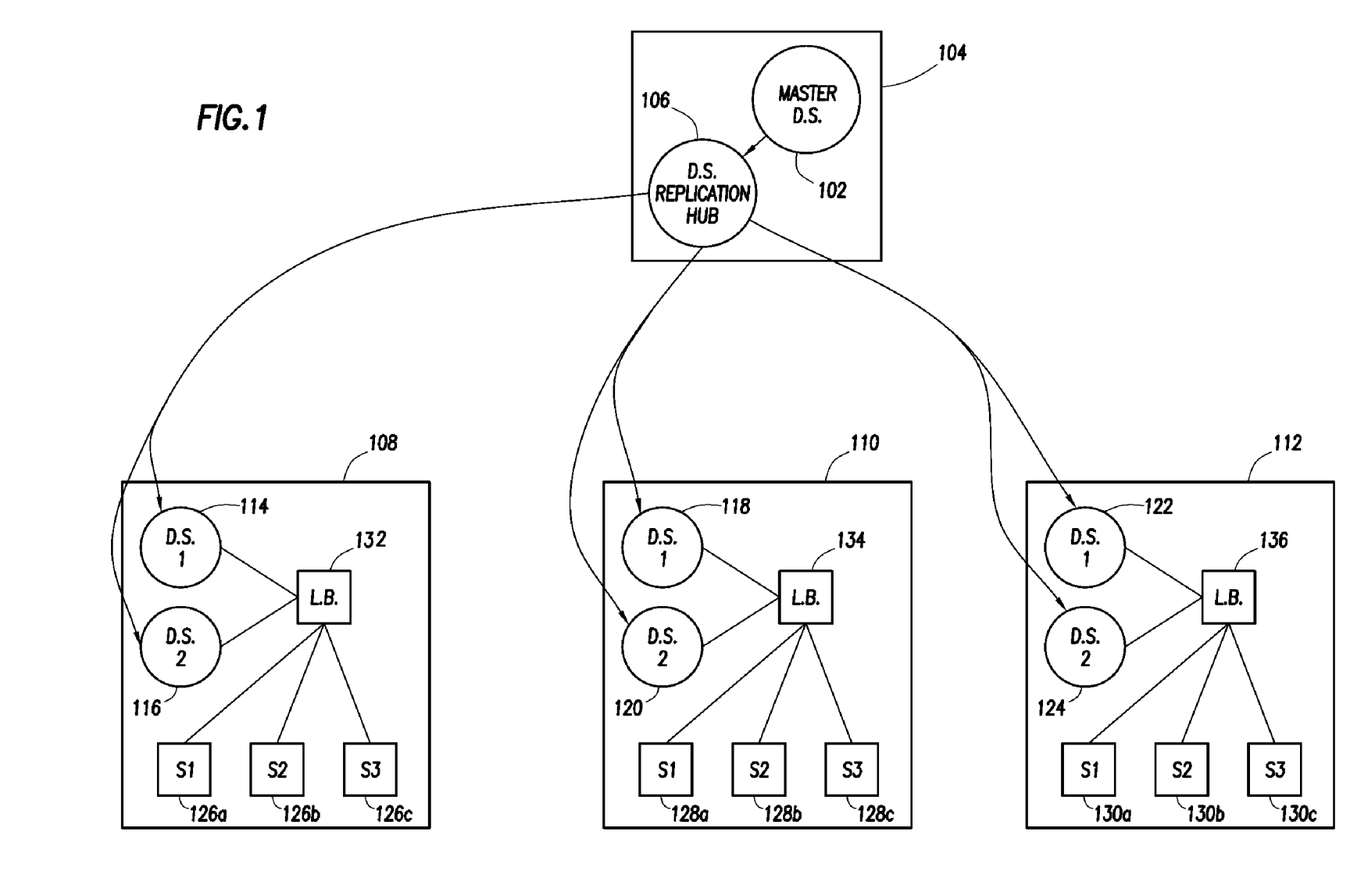
FIG. 1 is a block diagram of a system in which one embodiment of the system and method of the present invention can be implemented.

FIG. 1 is a block diagram illustrating a system in which an embodiment of the present invention can be implemented. This figure illustrates a representative arrangement that might be employed by an organization which provides infrastructure and support for the resources of several different customers on a communications network. For instance, these resources could be websites for access via the Internet or an intranet. For this purpose, the support organization may provide multiple servers to host these resources for each customer. These servers are typically housed in a facility known as a data center. The example of FIG. 1 illustrates four data centers 104, 108, 110 and 112. Each of the data centers 108, 110 and 112 contains multiple resource servers 126*a-c*, 128*a-c* and 130*a-c*, respectively. Depending on the nature of the web site or other resource to be provided via the communications network, these resource servers could be web servers, application servers, database servers, and the like. The data center 104, which is designated as the master data center, might typically also contain such servers, although they are not illustrated in the figure.

For some customers, all of the servers associated with their websites may be located in a single data center. Other customers, however, may have their servers distributed across multiple data centers, to provide redundancy. If the data centers are geographically dispersed, this arrangement also provides multiple locations from which end users can access the sites, and thereby reduce latency. When the various servers and other devices are distributed among multiple locations, it can be appreciated that authorized support personnel will require access to the multiple locations. For instance, personnel who are employed by a particular customer may require access to servers in two or more data centers, if that customer's site is distributed among multiple data centers. Furthermore, personnel from the support organization will likely require access to servers in all of the data centers.

Each time that a person attempts to access a server or other device in a data center, that device must determine whether the person is authorized for such access. Typically, the person identifies himself or herself by means of a user name and password, or equivalent form of unique identification. Hence, the device being accessed must determine whether the combination of a user name and password that is presented to it represents an authorized person. In accordance with the present invention, this determination is made with reference to data stored in a central or master account directory. In contrast to a database, a directory is better suited to an access control environment because the access credentials are typically read much more often than they are written. Hence, the complex update mechanisms associated with database systems represent unnecessary overhead in the context of access control. A directory update can be easily implemented in an atomic manner, i.e. the entire directory structure can be more readily replicated at once.

In the preferred implementation of the present invention, a central directory service is employed to maintain and manage access credentials. In FIG. 1, a centralized, master directory structure 102 is maintained by a directory server within the master data center 104. The master data center also contains a duplicate 106 of the master directory, which is used by the directory server as a replication hub to copy the directory structure to the various remote data centers 108, 110, 112.

A replicated version of the directory structure is maintained within each remote data center 108, 110, 112. For redundancy and load balancing purposes, multiple copies may be stored in each data center, which copies are known, in accordance with an embodiment of the present invention, as consumer copies of the directory structure. For example, the first remote data center 108 houses two copies 114, 116 of the directory structure. The second remote data center 110 houses two copies 118, 120 of the directory structure. Likewise, the third remote data center 112 houses two copies 122, 124 of the directory structure. Although two copies of the directory structure are shown within each of the remote data centers 108, 110, 112, each of these remote data centers may house multiple copies depending upon the usage load of each of the data centers, and other factors. Each replicated copy of the directory structure, 114-124, has an associated directory server to provide information from the stored directory to devices, e.g. servers 126-130, when requested.

The replicated versions of the directory structures contained within each of the remote data centers 108, 110, 112 are accessed by the resource servers 126a-c, 128a-c, 130a-c. Preferably, each of these servers accesses the directory structures by way of a load balancer 132, 134, 136. The load balancers 132, 134, 136 switch access by each of the servers between the various copies of the data structures contained within the remote data centers 108, 110, 112, according to load usage of each of the directory structures.

The system illustrated in FIG. 1 exhibits various advantages relative to prior systems. For example, the master directory structure 102 is not directly accessed by each of the remote data centers 108, 110, 112 or each server 126a-c, 128a-c, 130a-c, but rather by way of a copy. This avoids delays or denial of access if there is congestion or malfunction in the communication path between any of the remote data centers and the master data center 104. Furthermore, this removes the need for the devices or systems 126a-c, 128a-c and 130a-c to communicate directly with the master directory structure 102. Therefore, firewall conduits need not be created between those systems and the master directory structure 102. The absence of a conduit lessens the opportunity for an intruder to access the master structure. Additionally, the centrality of the data structure, obtained by using a single master directory service, and replicating the structure within the remote data centers 108, 110, 112, allows for a support organization to change the directory structure at a single location, and the changes are distributed by way of directory structure replication within the remote data centers 108, 110, 112.

Each of the servers and other devices in the data centers 104, 108, 110, 112 illustrated in FIG. 1 has an associated Internet Protocol (IP) address. As is known, each device may be represented by a unique hostname, also known as the Fully Qualified Domain Name (FQDN), that is linked to its IP address. The FQDN is composed of the domain-name prefixed by the hostname. For example, the name of the organization which owns the host (company-name) may be used within the domain-name, along with a prefix indicating the Domain Name Service (DNS) zone, equivalent to a logical area encompassing all devices in a remote data center. For example, the master data center 104 may be referenced by the DNS zone DC0. The first group of letters, DC0, refer to the data center 104 (Data Center 0), because of its centralized location and designated role as the hosting data center within the system for FIG. 1. The name of a host within DC0 is expressed with a FQDN of "hostname.dc0.company-name.com", for example, "cast01.dc0.company-name.com". The FQDN may be tailored to indicate the specific name of the host that is providing the functionality of the system in the data center.

Likewise, systems in the remote data centers 108, 110, 112, may be referenced by specific FQDNs that identify the host within the data center and domain and may contain the aforementioned hostname. For example, the first directory server in remote data center 108 illustrated in FIG. 1 may be referenced by the FQDN ds1.DC1.company-name.com, the second directory server in the remote data center 110 may be referenced by the FQDN ds2.DC2.company-name.com, and the second directory server in the third remote data center 112 may be referenced by the FQDN ds2.DC3.company-name.com.

The authentication credentials in the directory structure served by the directory server in the remote data center can be accessed by any web application including a web-server. For example, when a specific customer wishes to access a web-server, it may access the network site identified by the following URL: PROT://m0231DC1.cust.company-name.com (where "PROT" represents the protocol used for the communication; e.g. HTTPS). The webserver consults load-balancer 132 in remote data center 108 to provide the customer attempting to access its account information with a log-in screen. The log-in screen may require various forms of verification information, such as a user identification and password, for example. In this manner, a customer attempting to gain access to any of the servers 126a-c, 128a-c, 130a-c, may be granted such access only after that customer has been authenticated via information in the directory structure. This verification, or authentication, may be performed locally, as each copy of the directory structure within each of the data centers has a complete copy of the entire directory structure, including user authentication information.

The authentication information contained in the directory structure 102 is supplied from the replication hub 106 to each of the copies of the directory structure 114, 116, 118, 120, 122, 124 by way of a secure socket layer (SSL) transfer. These transfers are unidirectional from the directory structure replication hub 106 to each of the copies of the directory structure contained within the data centers 108-112, thereby preventing any corruption of the master directory structure within the host data center 104. Customers can submit requests to modify their own information for accessing the devices associated with their website. Such requests, once verified, allow system administrators to make additions to the master directory structure 102 at the data center 104, which in turn is copied by way of the directory structure replication hub 106 to each of the copies of the directory structure.

Figure 2:
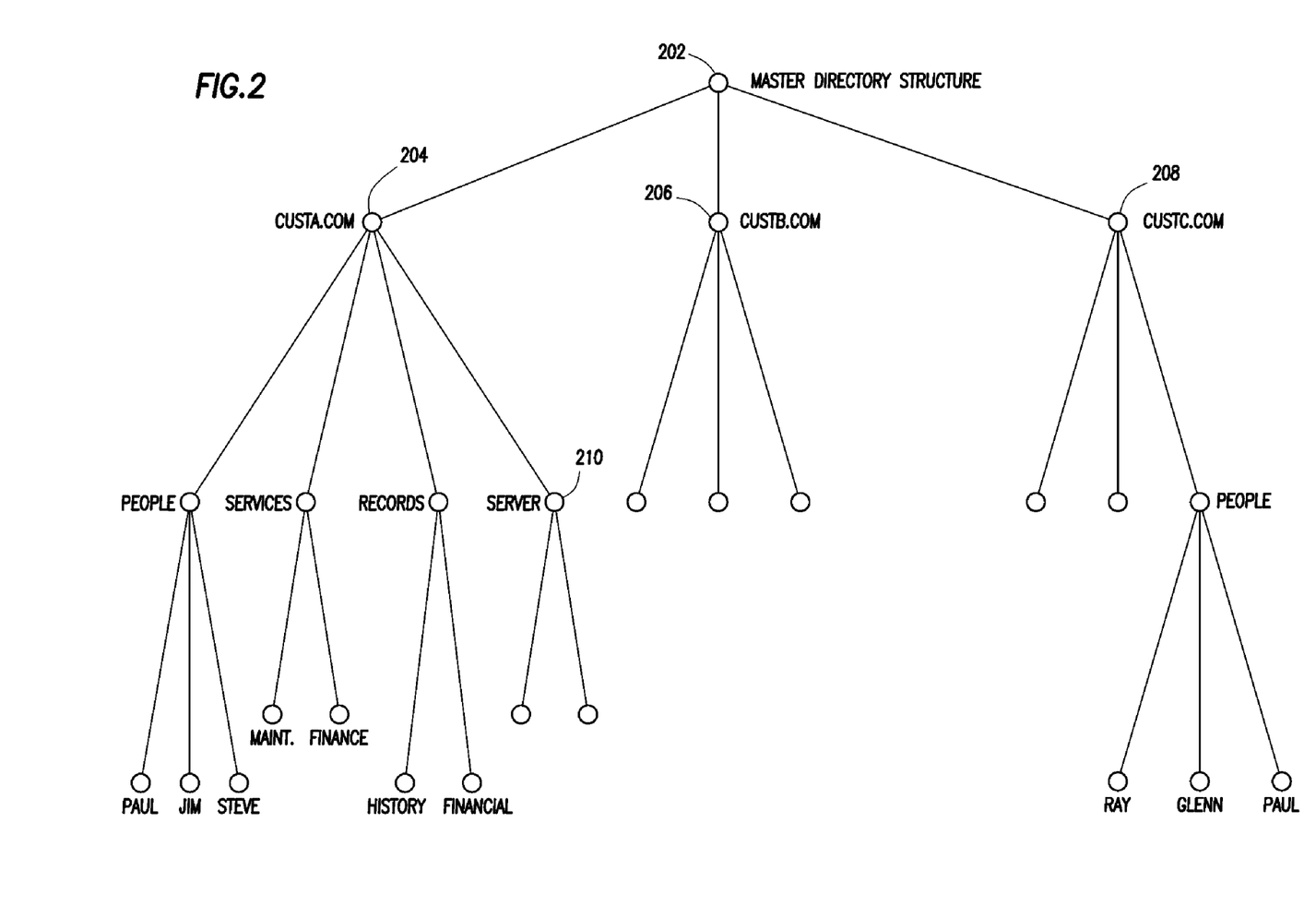
FIG. 2 is a diagram of the directory structure associated with one embodiment of the present invention.

An example of the directory structure used in accordance with one embodiment of the present invention is illustrated in FIG. 2. The directory structure illustrated in FIG. 2 is an example of a directory structure that can be replicated by the directory structure replication hub 106 of FIG. 1 into multiple copies of the directory structure within the remote data centers. This directory structure is a hierarchical structure that allows for access control on multiple levels. The master node 202 of the directory structure is illustrated at the highest hierarchical level. Immediately below the level 202 of the master directory structure is the customer level, which contains multiple customer nodes, or accounts 204, 206, 208. Each of these customer accounts is represented as the highest node of specific subdirectories, which relate exclusively to the customer identified in the customer level at the nodes 204, 206, 208.

Within the directory subtree of Customer A, identified by the Distinguished Name (DN) "o=CUSTA.com, o=cast", exists multiple nodes associated with the customer. A "People" node is a container node containing entries representing various personnel associated with Customer A that have access within Customer A's subtree 204. Each entry corresponding to an individual person contains attributes which represent access credentials. The people listed as having access within Customer A's sub-node may gain access to this account by way of a login procedure, such as the one described in connection with FIG. 1. In such a system, Paul, Jim, or Steve are shown as users that may log onto Customer A's servers by way of these access credentials, and may thus be granted access to the servers and other devices contained within the data centers that are associated with Customer A. These people associated with customer A will have access to only a portion of the resources represented in the master directory structure 202, specifically those within Customer A's account directory subtree 204, or all nodes directly below the node 204. This may include, for example, services of Customer A, such as maintenance or financial services, and/or records of Customer A, such as access history, or financial data. Additional services may be added to Customer A's account directory subtree.

An advantage of the hierarchical arrangement of the directory structure is that it enables access to be assigned to different levels. For instance, authorized users who appear under the "People" subnode of Customer A's node 204 would have access to all of the resources under node 204, but not any other nodes in the directory structure. A person logging on by way of another customer's directory subtree, or account, would not have access to the information of Customer A's account. Thus, authorized users for Customers B and C would not have access to any of the information contained within the directory subtree 204 associated with Customer A. The structure of each customer's account may differ, and the examples of nodes contained within customer A's directory subtree 204 are given by way of example only.

In addition to customer subaccounts 204, 206, 208, a host subtree 210 containing entries corresponding to individual servers can be accessed by way of the DN "cn=FQDN, ou=CUSTA.com, o=cast", where FQDN is the fully specified and qualified hostname of the server. This directory subtree is consulted by the authentication software on the server when deciding whether a user is allowed to log on to a server or not. This subtree contains access credentials for the server which supersede the list of access credentials within Customer A's directory subtree. The directory structure may allow for multiple instances of the same user name without conflicts. Thus, Paul may be a username for both Customer A and the host, as illustrated in FIG. 2 without conflict. The access granted to the people within the host's directory subtree 210 may vary depending upon the desires of the customers, and the need for maintenance of the master directory structure 202. For example, the various customers within the master directory structure 202 may wish to allow liberal access to specific people within the host's subaccount 210 for maintenance and configuration purposes. Increased access may also be granted as the situations arise that require such access.

In operation, a user who desires to access a particular resource server for maintenance or similar such purposes enters the URL for that server, e.g. PROT:// abcDC2.CustA.com: 1014, and is presented with a login prompt generated by the server. In response, the user enters a login name and password. The server then checks the name-password pair to determine if it is stored in the particular directory subtree with which that server is associated, e.g. node 204 in the case of a server that is part of Customer A's website. The server does so by contacting a directory service. One example of a directory service protocol which can be employed for this purpose is the Lightweight Directory Access Protocol (LDAP). This protocol is used to communicate with a directory server within the data center in which the resource server is located. For this purpose, each resource server has a client stub, or pluggable authentication module for LDAP ($PAM_{13}LDAP$), loaded into it. When the $PAM_{13}LDAP$ is loaded onto a resource server, it determines which customer is associated with that server, for example by examining configuration information stored in the server or in a separate database. Once this information is obtained, the $PAM_{13}LDAP$ restricts directory searches from its resource server to the particular subtree associated with the customer. Hence, the $PAM_{13}LDAP$ works with the directory server to maintain the segregation between the devices of different customers.

Upon receiving the login name and password, therefore, the PAM_LDAP contacts the directory server to determine whether that name-password pair is contained in the relevant directory subtree. If so, the credentials are checked and if they verify, the user is authorized and provided access to the resource server.

FIGS. 3a-3h illustrate flow charts associated with the installation, configuration and replication setup and initiation of the replicated and master directory structure, such as the master directory structure 102 illustrated in FIG. 1, or the master directory structure 202 illustrated in FIG. 2. The same procedure is carried out in the master data center 104 to install the master directory structure 102 and to install the replication hub 106, as well as in the remote data centers 108-112 to install the replicated copies. There are several benefits to the automated installation depicted in these flowcharts. First, no user input is required after starting the installation. All configuration values, hostnames etc. are determined by the installation and configuration script from the host and environment in which it is run. Secondly, since the installation is automated, it is a very simple task to add new directory servers into the data-center network environment. Furthermore, because of the automation, if one of the directory servers in a data center fails, a new one can be provisioned quickly.

Figure 3A:
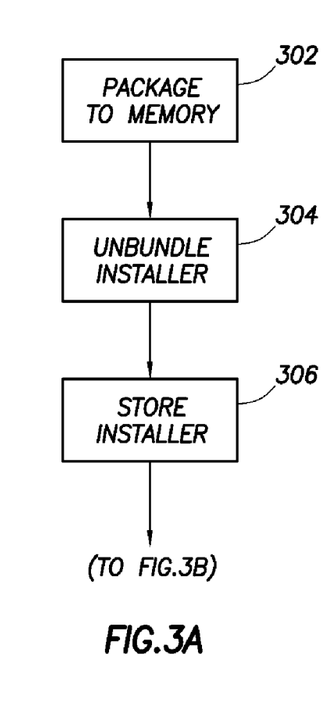

In FIG. 3a, a software package such as the Redhat Package Manager (RPM) used by the UNIX, or LINUX, operating system (OS) is read into the memory of a server on which the directory services is to operate, at step 302. Preferably, this server is on the main network of the support organization, so that it is readily accessible by various subnetworks associated with respective individual customers. Once the package had been read into memory, an installer which is contained in the package is unbundled in step 304. After the installer is unbundled, it is then stored on the hard drive or other computer storage medium for future use in step 306.

Figure 3B:
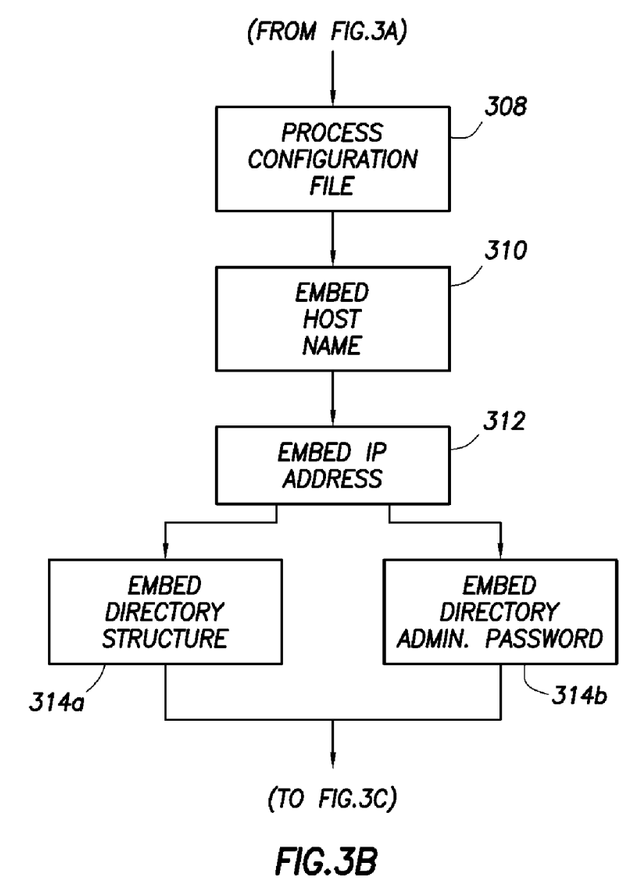

At step 308, in FIG. 3b, the configuration file of the installer is processed. This installer configure file may be a silent-installer configuration file. A silent-installer does not prompt or ask the user for input during the installation process. Typically a silent installer consists of the same installation executable file as for non silent-install, but in the case of a silent install, the executable is also passed a file containing the values which would have been prompted for if the installation was not a silent one. For example, a directory server installer may prompt the user to specify the current hostname. A silent installer configuration file lists the hostname on a line within the file, so the installer does not have to prompt for the hostname.

Figure 3C:
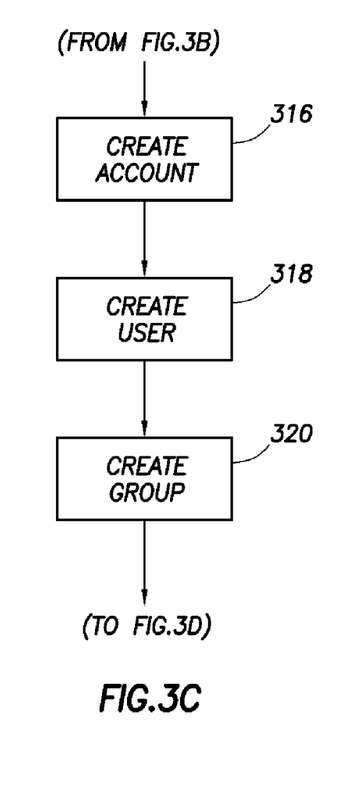

The hostname and IP address of the server on which installation is happening are embedded in the directory at steps 310 and 312, respectively. At step 314a, the directory structure is embedded, or at step 314b, the directory administration password is embedded. Subsequently, at step 316 of FIG. 3c, an account is created, in whose identity the directory server will run. A user identification, or user name, is created at step 318 that is associated with the account created at step 316. At step 320, a group in whose identity the server will run is created. Creating the user and group identities associated with the account formed at step 316 serves to create a limited ability account, in which only limited access is granted to users logging onto the system; namely, each user is granted access only to the information contained within the account associated with that user.

Figure 3D:
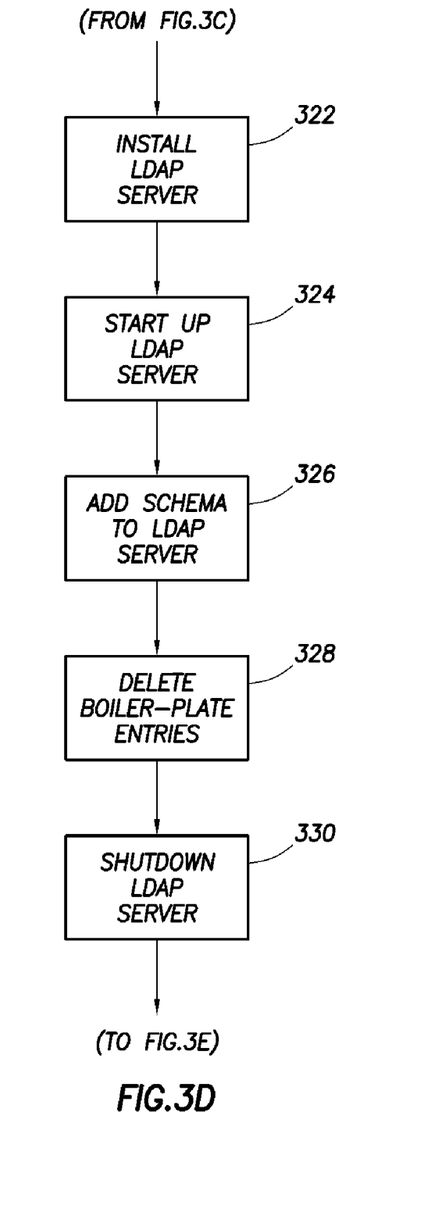

At step 322 in FIG. 3d, the lightweight directory access protocol (LDAP) server, which is used to access serve directory listings, is installed on the server. This installation may also take place by way of a silent-installer, such as the silent-installer mentioned above in connection with FIG. 3b. Once the LDAP server has been installed, it is started up in step 324. Subsequently, at step 326, the schema of the support organization is added to the LDAP server. In essence, the schema is the set of rules or guidelines or constraints which limit the format and therefore the content of entries in the directories. For example, a directory server's schema will often mandate that when creating a new user entry, a commonName must to be specified. So if an attempt is made to create an entry which does not specify a common-name at creation time, a schema constraint is violated and the creation attempt will be rejected by the server. For a support organization that needs to add new types of entries to a directory server (not just people entries), the standard directory server schema can be appropriately extended. Otherwise the directory server would reject an attempt to create an entry of the new type.

Thereafter standard boiler-plate entries of the LDAP directory, which may have been installed at step 322, are deleted at step 328. Then, at step 330, the LDAP server is shut down.

Figure 3E:
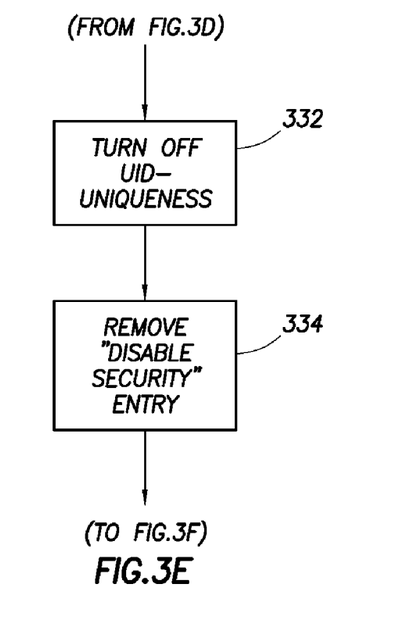

At step 332, in FIG. 3e, the option of checking the uniqueness of each user ID within the entire directory structure of the LDAP server (including all subdirectories), is switched off. This allows multiple customers to have the same user identification or username. Thus, should a user for Customer A wish to have a user identification name that is the same as a user identification name desired by a user for Customer C, both customers may use this name. For example, if two customers desire Paul as a user name, turning off the uniqueness check of the user identification within the LDAP server will allow for this possibility. Additionally, for maintenance purposes, the "disable security" entry is deleted from the LDAP server configuration file at step 334, thereby allowing security to be implemented by way of the LDAP server.

Figure 3F:
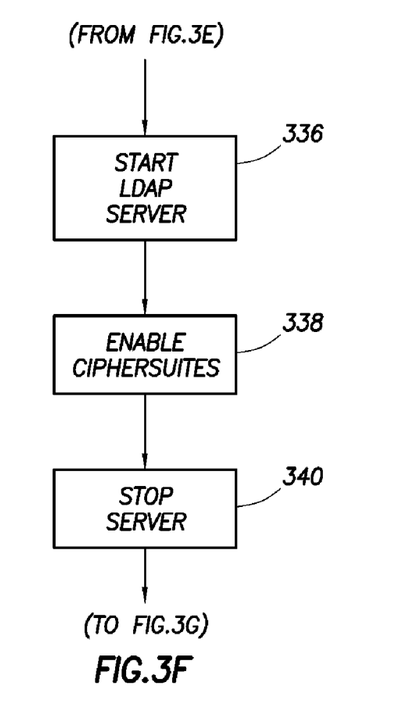
Figure 3G:
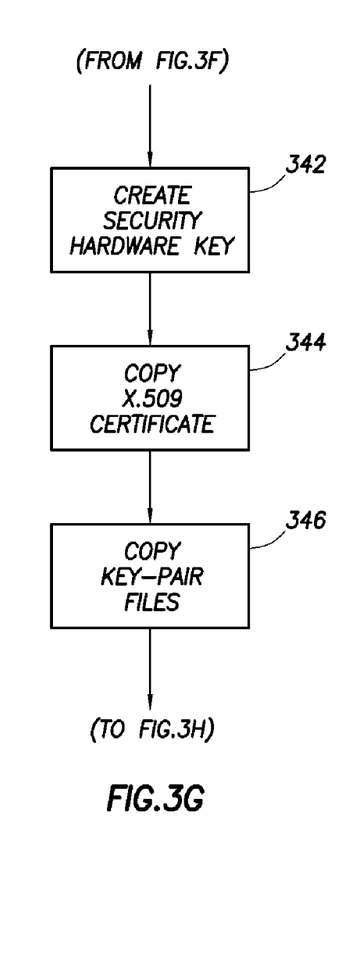

Once the modifications have been performed on the LDAP server and its configuration file, the LDAP server is again started at step 336 of FIG. 3f. Specific ciphersuites, or security software, is enabled at step 338. Some such ciphersuites that may be used with the present invention include, but are not limited to: RC2, RC4, MD5, SHA, and 3DES. Once the proper ciphersuite has been enabled at step 338, the LDAP server is stopped in step 340.

Once the LDAP server has been stopped in step 340, the installer creates two files on-disk at a location where the directory server will later expect them. These two files are a key database and a certificate database. The key database contains a private key used for the purpose of public/private encryption algorithms. The certificate database contains X.509-compliant digital certificates. Next the installer creates a dongle file, continuing a password which allows access to the key database.

Figure 3H:
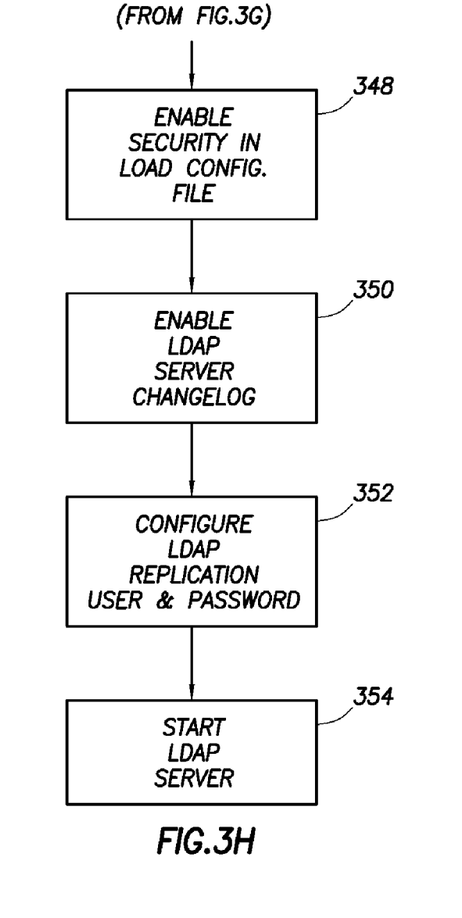

At step 348, security is enabled in the LDAP configuration file, as shown in FIG. 3h. Then the LDAP server changelog is enabled at step 350. Subsequently, the LDAP replication user and password are configured at step 352, and the LDAP server is started at step 354.

Figure 4:
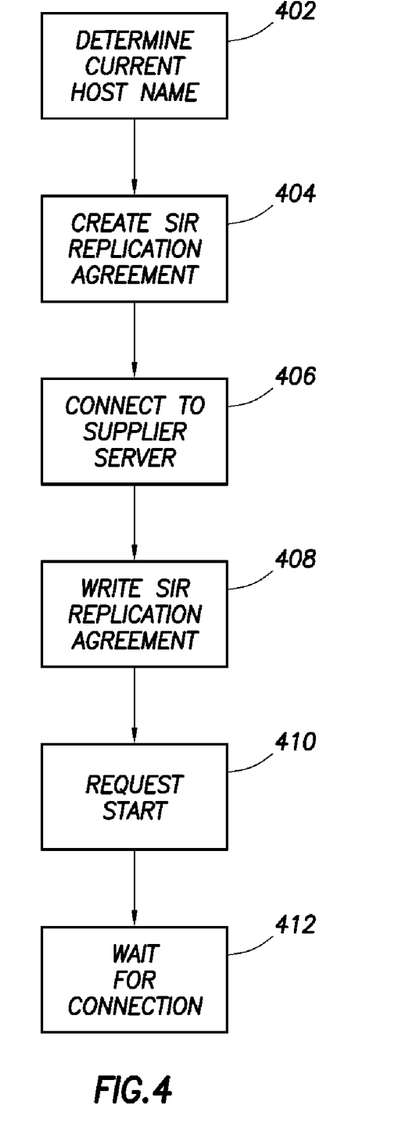
FIG. 4 is a flow diagram illustrating steps associated with the configuration of the centralized database in accordance with one embodiment of the present invention.

In FIG. 4, the configuration of the master server directory structure, the replication hub server of the directory structure, or the consumer directory structure replication is described in flow chart form. The configuration that is performed at install time in the manner illustrated in the flowchart of FIG. 4 is a supplier initiated replication (SIR), which means the supplier, or host, initiates any replication or configuration of the master directory structure to the consumer. Any changes are then communicated by way of replication to each of the copies of the directory structure throughout the network structure. As with the base server installation, the replication installer and configuration software does all the replication configuration, setup and initiation without user intervention. This facilitates easy installation, rapid server rollout or replacement and provisioning.

First, a current hostname must be determined in step 402. Upon such determination, the SIR replication agreement must be created within the LDAP Directory Interchange Format(LDIF) for writing to the supplier LDAP server's machine data at step 404. Following are the contents of an example LDIF file for new directory entry:

dn: uid=john, ou=people, o=hostname.com
objectclass: top
objectclass: person
objectclass: organizationalPerson
objectclass: inetOrgPerson
objectclass: ntUser
objectclass: nsCalUser
objectclass: mailRecipient
objectclass: nsLicenseUser
objectclass: companyOrgPerson
sn: Doe
givenname: John
cn: John Doe The supplier server is then connected to at step 406, and the SIR replication agreement is written to the supplier at step 408. An immediate start of the replication is then requested by modifying the online replicate creation attribute on the supplier at step 410. Then a connection and stream replication of updates are awaited from the supplier at step 412.

Figure 5:
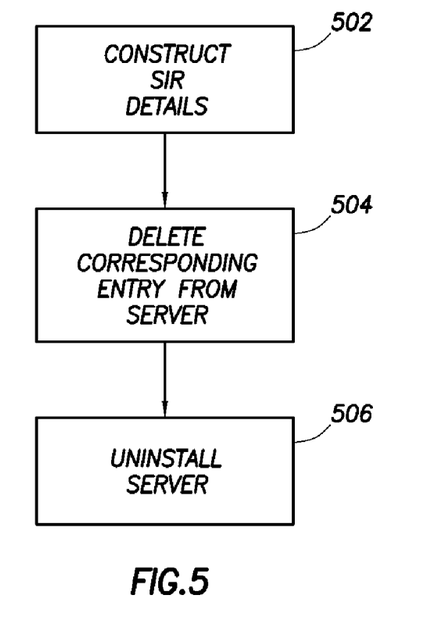
FIG. 5 is a flow diagram illustrating the steps associated with the uninstallation of the centralized directory structure in association with one embodiment of the present invention.

The flowchart of FIG. 5 illustrates the manner in which a directory server and structure may be uninstalled. This is performed in essentially the reverse order, as the SIR replication agreement details are constructed at step 502, and the corresponding entry is deleted from the server in step 504. Then the consumer server is uninstalled in step 506.

The foregoing description has been provided in the context of a system and method for providing account management within a network having the ability for automated provisioning, maintenance, and configuration of servers connected to a communication network. It will be appreciated by those of ordinary skill in the art that the present invention can be embodied in other forms without departing from the spirit or characteristics thereof. For instance, while an exemplary embodiment of the present invention has been described in the context of having a single host data server, it is fully contemplated that multiple host data centers could be employed using the system and method of the present invention. In such a system, multiple host data centers communicate with a single location that stores the master directory structure. Precautions are taken to ensure that each host data center would have an up-to-date version of the directory structure contained within the central master directory structure data center.

The foregoing description is, therefore, considered in all aspects to be illustrative and not restrictive. The scope of the invention is indicated by the following claims and all changes that come within the meaning and range of equivalents are therefore intended to be embraced therein.

What is claimed is:

1. A method for authenticating users to individual network devices that are distributed among a plurality of locations, comprising the following steps:

storing a directory structure at one of said locations, said directory structure comprising a root node, a first level of nodes below said root node that are associated with respective organizations to which said network devices are assigned, and at least one further level of nodes below said first level that identify users who are authorized to access the network devices assigned to the organization associated with a parent first-level node and authentication information for said users;

replicating said directory structure among said plurality of locations;

in response to a request by a user for access to one of said network devices, determining which organization to which said one device is assigned and whether said user is identified on a node below the first-level node associated with the determined organization; and authenticating said user to said device if the user is so identified.

2. The method of claim 1, wherein said directory structure further includes nodes below said first level that identify resources of an associated organization to which authenticated users are allowed access.

3. The method of claim 1, wherein said determining step is performed with reference to a replicated copy of said directory structure at the location containing said one device.

4. The method of claim 1 wherein said network devices comprise servers, and said locations are data centers.

5. The method of claim 1, wherein at least some of said locations contain at least two replicated copies of said directory structure, and further including the steps of distributing access requests among said replicated copies by means of a load balancer.

6. The method of claim 1, wherein the same user identification and authentication information is contained at a plurality of said further level nodes that are respectively associated with different ones of said first-level nodes.

7. The method of claim 1, wherein said replicating step is carried out automatically without user input.

* * * * *

UNITED STATES PATENT AND TRADEMARK OFFICE
CERTIFICATE OF CORRECTION

| | | |
|---|---|---|
| PATENT NO. | : 7,437,437 B2 | Page 1 of 1 |
| APPLICATION NO. | : 09/841008 | |
| DATED | : October 14, 2008 | |
| INVENTOR(S) | : Paul Kennedy | |

It is certified that error appears in the above-identified patent and that said Letters Patent is hereby corrected as shown below:

In column 8, line 7, delete "(PAM$_{13}$LDAP)" and insert -- (PAM_LDAP) --, therefor.

In column 8, line 8, delete "PAM$_{13}$LDAP" and insert -- PAM_LDAP --, therefor.

In column 8, line 12, delete "PAM$_{13}$LDAP" and insert -- PAM_LDAP --, therefor.

In column 8, line 14, delete "PAM$_{13}$LDAP" and insert -- PAM_LDAP --, therefor.

Signed and Sealed this

Fourth Day of August, 2009

JOHN DOLL
*Acting Director of the United States Patent and Trademark Office*